US009840161B2

United States Patent
Chikkannanavar et al.

(10) Patent No.: US 9,840,161 B2
(45) Date of Patent: Dec. 12, 2017

(54) CIRCUIT AND METHOD FOR DETECTION OF BATTERY CELL DEGRADATION EVENTS

(71) Applicant: Ford Global Technologies, LLC, Dearborn, MI (US)

(72) Inventors: Satish B. Chikkannanavar, Canton, MI (US); Joseph F. Freiman, Walled Lake, MI (US); Yonghua Li, Ann Arbor, MI (US); Benjamin A. Tabatowski-Bush, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 120 days.

(21) Appl. No.: 15/066,581

(22) Filed: Mar. 10, 2016

(65) Prior Publication Data

US 2017/0259687 A1 Sep. 14, 2017

(51) Int. Cl.
*H02J 7/00* (2006.01)
*B60L 11/18* (2006.01)

(52) U.S. Cl.
CPC ......... *B60L 11/1861* (2013.01); *H02J 7/0029* (2013.01); *H02J 7/0047* (2013.01); *H02J 2007/0037* (2013.01); *H02J 2007/0049* (2013.01)

(58) Field of Classification Search
CPC ... B60L 11/1861; H02J 7/0029; H02J 7/0047; H02J 2007/0037; H02J 2007/0049
See application file for complete search history.

(56) References Cited

U.S. PATENT DOCUMENTS

| 6,531,847 | B1 | 3/2003 | Tsukamoto et al. | |
|---|---|---|---|---|
| 8,049,465 | B2* | 11/2011 | Barsoukov | G01R 31/3606 320/132 |
| 8,049,645 | B2 | 11/2011 | Barsoukov et al. | |
| 2007/0210769 | A1* | 9/2007 | Tsutsumi | H01M 10/425 323/269 |
| 2009/0027056 | A1 | 1/2009 | Huang et al. | |
| 2010/0305792 | A1 | 12/2010 | Wilk et al. | |
| 2011/0015815 | A1 | 1/2011 | Bertness | |
| 2012/0176092 | A1* | 7/2012 | Fujii | G01R 31/361 320/134 |

(Continued)

FOREIGN PATENT DOCUMENTS

CN 1437031 A 8/2003

OTHER PUBLICATIONS

Mahmood Tabaddor, New Internal Short Circuit Test Development for Battery Safety Standards, Underwriters Laboratories Inc., 2011 U.S.-China Electric Vehicle and Battery Technology Workshop, 22 pgs.

(Continued)

*Primary Examiner* — Vuthe Siek
(74) *Attorney, Agent, or Firm* — David B. Kelley; Brooks Kushman P.C.

(57) ABSTRACT

A battery management system for a vehicle includes a controller configured to, in response to a rate of change of voltage during discharge of a battery cell exceeding a first threshold more than a predetermined number of times over a predefined duration, output an error signal, and in response to the rate of change exceeding a second threshold greater than the first, output the error signal.

19 Claims, 6 Drawing Sheets

(56) References Cited

U.S. PATENT DOCUMENTS

2012/0231308 A1 9/2012 Chiang et al.
2016/0001719 A1* 1/2016 Frost .................. B60L 11/1868
307/10.1

OTHER PUBLICATIONS

Sean Gallagher, NTSB Blames Bad Battery Design—and Bad Management—in Boeing 787 Fires, Dec. 2, 2014, http://arstechnica.com/information-technology/2014/12/ntsb-blames-bad-battery-design-and-bad-management-in-boeing-787-fires/, 5 pgs.
M.C. Smart et al., Effects of Electrolyte Composition on Lithium Plating in Lithium-Ion Cells, Journal of Electrochemical Society, 158, 2011, pp. A379-A389.
Minggao Ouyang, Internal Short Circuit Detection for Battery Pack Using Equivalent Parameter and Consistency Method, Journal of Power Sources 294, 2015, pp. 272-283.
Andrew Dickerson et al., Determining Remaining Useful Life for Li-Ion Batteriers, SAE Technical Paper 2015-01-2584, 2015, doi: 10.4271/2015-01-2584, 5 pgs.

* cited by examiner

CIRCUIT AND METHOD FOR DETECTION OF BATTERY CELL DEGRADATION EVENTS

TECHNICAL FIELD

This application generally relates to battery cell discharge or drain detection for vehicles.

BACKGROUND

A hybrid-electric or all-electric vehicle includes a traction battery constructed of multiple battery cells in series and/or parallel. The traction battery provides power for vehicle propulsion and accessory features. During operation, the traction battery may be charged or discharged based on operating conditions.

SUMMARY

A battery management system for a vehicle includes a controller configured to, in response to a rate of change of voltage during discharge of a battery cell exceeding a first threshold more than a predetermined number of times over a predefined duration, output an error signal, and in response to the rate of change exceeding a second threshold greater than the first, output the error signal.

A vehicle battery management system includes a controller configured to, in response to a rate of change of voltage of a battery cell exceeding a first threshold while partially discharging the battery cell during a recharge event, or in response to a number of instances in which the rate of change exceeds a second threshold that is less than the first threshold exceeding a count threshold, output an error signal.

A method of operating a battery pack for a vehicle includes discharging a battery cell when the battery cell exceeds a state of charge threshold, and in response to a rate of change of voltage of the battery cell exceeding a first threshold more than a predetermined number of times during a predefined discharge duration, or the rate of change exceeding a second threshold greater than the first threshold, outputting a fault signal.

DETAILED DESCRIPTION

Figure 1:
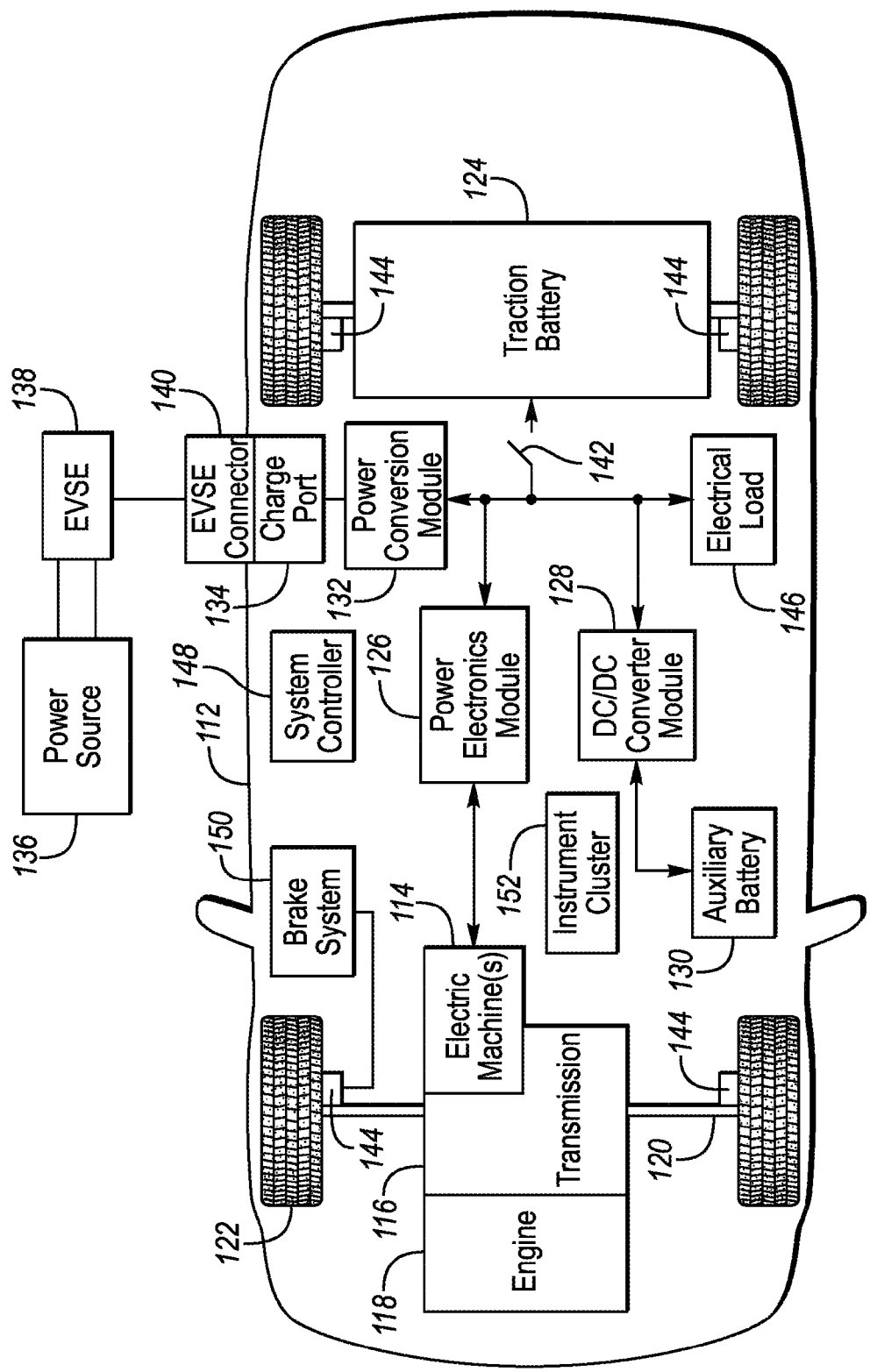
FIG. 1 is a diagram of a hybrid vehicle illustrating typical drivetrain and energy storage components.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The traction batteries such as Li ion batteries are an integral component of hybrid, plug-in hybrid and battery electric vehicles (HEVs, PHEVs and BEVs respectively). Batteries are typically constructed of multiple individual battery cells in which the battery cells are designed to operate for specified timeframe typically multiple years or specified number of miles of usage by customers. Detection of any premature failure or loss of function of a cell in the battery pack is desired to provide an alert an owner such that the vehicle may be taken in for service prior to any loss of functionality. A failure or loss of function may be caused by multiple mechanisms including a high resistance internal short, a low resistance internal short, and Li plating on components inside a cell. Another mechanism of excess capacity loss includes accelerated chemical changes inside a cell. The detection of an imminent cell failure by conventional means has not been reliable and the nature of cell failure events along with the relatively low rate of failures poses challenges for unambiguous detection.

Here, systems and methods are presented to detect various mechanisms of premature loss of cell function or cell failure events. The predictive nature of this feature warns the user of imminent loss of functionality. These events may include a high resistance internal short due to cell manufacturing defects by a supplier, a low resistance internal short due to cell manufacturing defects by a supplier, Li plating during vehicle charging at low ambient temperatures, accelerated capacity loss due to unexpected chemical changes inside the cell. During these events changes in a cell voltage under known or controlled conditions reflect the associated events mentioned earlier. By detecting such voltage changes during cell operation inside the customer vehicles we can anticipate loss of cell function or cell failure. These systems and methods provide a detailed diagnostic description of the functional deficiencies that help identify a faulty traction battery before a customer becomes stranded or before a battery becomes a safety concern.

Vehicle traction batteries may include a battery energy control module (BECM) located inside a battery pack that monitors battery cell voltage, battery current and a selective battery cell temperature or a battery cell module temperature. Also, the BECM either directly or indirectly controls the amount of charge current or load current going into or out of the battery. The BECM may be configured to run diagnostic checks to assess the battery pack health through detection of imminent cell failures. Such diagnostic tests may involve conducting a continuous discharge or charge test at a rate of 1 C or other low rates, followed by analysis of a voltage differential (e.g. dV/dt, dV/dQ, dV/dSOC), or resistance (dV/dI) while looking for signatures or indications of an abnormal change in the values.

Internal battery cell shorts may be categorized as a micro short, a hard short, or a soft short. A micro short is a transient internal short (e.g., a short is made and broken within a duration of time) that releases enough thermal energy to damage the separator, but insufficient energy to result in thermal runaway. A hard short is a permanent, low resistance internal short that could lead to thermal runaway depending upon the state-of-charge of the cell. A soft short is a permanent, high resistance internal short that results in a higher than normal self-discharge rate, but does not cause a cell to overheat. Both hard short and soft short events lead to a reduction in an open circuit voltage (OCV) for the affected battery cell and may compromise the battery cell operation.

The internal shorts of a cell may rarely occur and are typically difficult to detect. Depending upon the mechanics of development of the short and which internal cell components are in contact with each other, the short may become a relatively benign high resistance internal short, or a more dangerous low resistance internal short. A high resistance internal short results in a self-discharge rate that is higher than normal; while a low resistance internal short may quickly lead to a thermal runaway event. One theory is that multiple high resistance internal shorts frequently precede a low resistance internal short. Therefore, detection of high resistance internal shorts is beneficial to predict the possibility of an imminent, more dangerous low resistance internal short.

One method includes monitoring dV/dI. Normally changes in cell voltages are proportional to current, with proportionality constant being resistance (V=IR). The proportionality constant or resistance is a function of a state of charge (SOC) of the battery cell and a temperature of the battery cell. With knowledge of these parameters, a determination about a voltage response of the cell to a dynamic current input (e.g., charge or discharge, pulse or continuous) is possible when the range of voltage responses expected is within measurement tolerances. For example, a voltage response smaller than expected for a given current direction and magnitude may indicate a real time occurrence of a low resistance internal short providing a parallel path for the current to pass. This event may be followed by one of the two paths, first the cell may result in a quick (within 10 s of seconds) thermal runaway, or second, a low resistance short may become an open circuit leaving behind a carbonized separator material which may result in a high resistance short between the anode and the cathode.

Another method includes monitoring dV/dt and cell balance rates or frequency. Tracking a rate of change of a battery voltage while no current is flowing allows identification of a cell having a higher self-discharge rate than normal. If control circuitry is balancing the SOC of the cells of a battery pack, the amount of balancing activity may indicate a cell that has a higher self-discharge rate than normal caused by a high resistance internal short. Each detection of a high resistance internal short may be stored as a function of service life for each cell. To avoid false state-of-health alarms, software flags may be limited to be set only when a filtered trend line for detection of high resistance internal shorts exceeds a pre-determined value, after which the BECM may then output a warning.

In another embodiment, a delay of approximately 25 seconds was noted between an initial indication of the voltage signature (based on a change in battery cell voltage) of an internal short to a venting condition of the cell due to thermal runaway. The venting condition may typically follow the large drop in cell voltage signal induced by a hard short, as signaled by a second negative dV/dt spike. By detecting the voltage signature during discharging or charging of a suspect cell inside a battery pack, an early detection of a cell failure event may be possible. Note that, a distinction may be made for the high and low resistance internal shorts based on the condition, $|dV/dt|_{Hard\ Short} > |dV/dt|_{Soft\ Short}$ in which $|dV/dt|$ refers to an absolute value of the derivative.

An implementation consideration may include detection of this failure mode during a time a battery is in charge mode. Here, the battery controller and battery pack enter a charge mode while the controller provides a constant charge current to the battery pack. During the charge mode, battery measurements may be made and a voltage of the battery may be recorded. Also, values of the change in battery voltage with respect to time (dV/dt) may be recorded. Any negative voltage spike with respect to time (−dV/dt) while a positive charge current is flowing is indicative of the development of a momentary internal short.

Further, these techniques may be used for detection of Li plating inside a battery cell. Li plating typically occurs on the negative electrode during cell charging at low ambient temperatures such as 0 degC to −40 degC. Although battery control algorithms typically limit charge power at low temperatures to prevent lithium plating, the effect is cumulative. The ability to monitor the battery cells to determine if any plating thresholds have been exceeded may be beneficial. A battery cell voltage during discharge may present an indication of a plateau in a high SOC region due to Li plating on the negative electrode. The voltage differential may be indicated by a broad peak in the high SOC region indicative of Li plating for dV/dQ> threshold value. Likewise, dV/dSOC analysis may be used as it yields similar results and can be used for Li plating analysis. Detection of this signature using a discharge profile by a controller allows detection of a potential presence of Li plating allowing an alert about the potential for a cell failure due to an internal short caused by the growth of a lithium dendrite in the battery.

Further enhancement of Li plating detection and prediction may include a collection of a series of measurements. The series of measurements may provide trend data that may be used to determine a change in plating. For example, based on numerous data sets collected at different times, trend information regarding the voltage signature as compared with earlier data may provide information regarding plating.

Another implementation consideration of permanent plating determination includes an estimation based on historical data collected during the discharge process. As plating increases, the magnitude of the peak of dV/dQ (or dV/dSOC) will increase, allowing us to identify a possible cell fault scenario.

As plating increases, the dV/dQ or dV/dSOC peak will increase. A design consideration may include, during begin-of-life battery testing, an upper calibration threshold and a comparison if the upper calibration threshold is ever exceeded at a certain temperature, a certain current flow, or a certain battery state of charge. If the threshold is exceeded, then battery plating may have reached a critical level. In another embodiment, a lower calibration threshold and a count of a number of times the lower calibration threshold is exceeded at a certain temperature range, or at a certain current flow range, or at a certain battery state of charge range. Also, Li plating is invariably accompanied by degradation in intrinsic cell capacity. With accelerated Li plating we may expect faster decline in cell capacity.

The analysis of peak features in this article relies on the numerical values for voltage, time, charge and SOC used or measured by the controller. At times, these signals could be noisy and we would employ filtering techniques to extract desired information. The magnitude of the peak values for dV/dt, dV/dQ and dV/dSOC would be different accordingly and will be used judiciously for cell fault analysis, detection and further action taken.

Other excess cell capacity loss events may occur due to accelerated chemical changes inside the cells, which may be the result of the cell aging process. Cell capacity may be determined by performing a discharge test or charge test at a known fixed rate, such as 1 C. A C-rate is a measure of a rate at which a battery is discharged relative to its maximum capacity. A 1 C rate means that the discharge current will discharge the entire battery in 1 hour. For example, a battery with a capacity of 10 Amp-hours, a 1 C rate is a discharge current of 10 Amps for one hour, a 0.5 C rate is 5 amps for a two-hour discharge, and a 2 C rate is 20 amps for a half-hour discharge. A controller may evaluate the cell capacity and may output a signal such as an alert based detection of a low level capacity. When any capacity value drops below a pre-determined value (e.g., $0.7*Cap_{BOL}$) the controller may output a signal. This capacity check may be performed on individual battery cells, clusters of battery cells or a battery pack. Cell capacity may also be determined opportunistically by a controller when two qualified SOC readings are obtained after which the controller may divide the charge that has passed between the two SOC readings by the difference in the SOC readings. Also, the capacity data may be logged for each cell over a period of time and trends may be observed and recorded. When absolute capacity or the rate of change of capacity exceeds a pre-determined threshold, a signal may be output from the controller.

FIG. 1 depicts a typical plug-in hybrid-electric vehicle (PHEV). A typical plug-in hybrid-electric vehicle 112 may comprise one or more electric machines 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and deceleration capability when the engine 118 is turned on or off. The electric machines 114 also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions.

A traction battery or battery pack 124 stores energy that can be used by the electric machines 114. A vehicle battery pack 124 typically provides a high voltage direct current (DC) output. The traction battery 124 may be electrically coupled to one or more power electronics modules. One or more contactors 142 may isolate the traction battery 124 from other components when opened and connect the traction battery 124 to other components when closed. The power electronics module 126 may also be electrically coupled to the electric machines 114 and provides the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124. The description herein is equally applicable to a pure electric vehicle. For a pure electric vehicle, the hybrid transmission 116 may be a gear box connected to an electric machine 114 and the engine 118 may not be present.

In addition to providing energy for propulsion, the traction battery 124 may provide energy for other vehicle electrical systems. A vehicle 112 may include a DC/DC converter module 128 that converts the high voltage DC output of the traction battery 124 to a low voltage DC supply that is compatible with low-voltage vehicle loads. An output of the DC/DC converter module 128 may be electrically coupled to an auxiliary battery 130 (e.g., 12V battery). The low-voltage systems may be electrically coupled to the auxiliary battery. Other high-voltage loads 146, such as compressors and electric heaters, may be coupled to the high-voltage output of the traction battery 124. The electrical loads 146 may have an associated controller that operates and controls the electrical loads 146 when appropriate.

The vehicle 112 may be an electric vehicle or a plug-in hybrid vehicle in which the traction battery 124 may be recharged by an external power source 136. The external power source 136 may be a connection to an electrical outlet. The external power source 136 may be electrically coupled to a charger or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for plugging into a charge port 134 of the vehicle 112. The charge port 134 may be any type of port configured to transfer power from the EVSE 138 to the vehicle 112. The charge port 134 may be electrically coupled to a charger or on-board power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling.

One or more wheel brakes 144 may be provided for decelerating the vehicle 112 and preventing motion of the vehicle 112. The wheel brakes 144 may be hydraulically actuated, electrically actuated, or some combination thereof.

The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system connections may be hydraulic and/or electrical. The brake system 150 may include a controller to monitor and coordinate operation of the wheel brakes 144. The brake system 150 may monitor the brake components and control the wheel brakes 144 for vehicle deceleration. The brake system 150 may respond to driver commands and may also operate autonomously to implement features such as stability control. The controller of the brake system 150 may implement a method of applying a requested brake force when requested by another controller or sub-function.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1 but it may be implied that the vehicle network may connect to any electronic module that is present in the vehicle 112. A vehicle system controller (VSC) 148 may be present to coordinate the operation of the various components.

Figure 2:
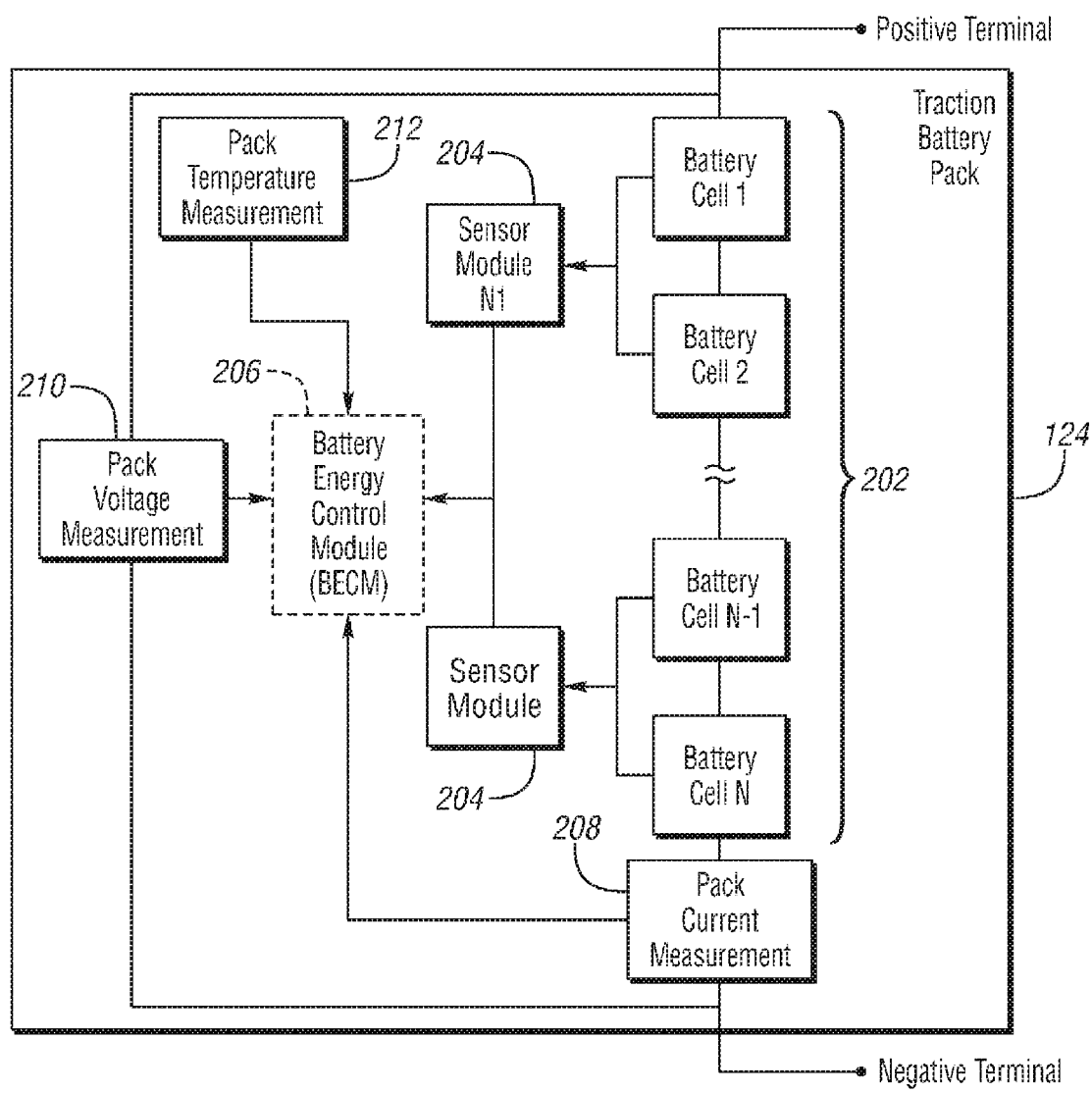
FIG. 2 is a diagram of a possible battery pack arrangement comprised of multiple cells, and monitored and controlled by a Battery Energy Control Module (BECM).

A traction battery 124 may be constructed from a variety of chemical formulations. Typical battery pack chemistries may be lead acid, nickel-metal hydride (NIMH) or Lithium-Ion. FIG. 2 shows a typical traction battery pack 124 in a simple series configuration of N battery cells 202. Other battery packs 124, however, may be composed of any number of individual battery cells connected in series or parallel or some combination thereof. Also, battery cells 202 may be constructed of multiple anode and cathode plates coupled in either series and/or parallel, in which the term battery cell is the smallest structure configured to be directly measured and monitored by a sensor module 204. A battery management system may have one or more controllers, such as a Battery Energy Control Module (BECM) 206, that monitor and control the performance of the traction battery 124. The battery pack 124 may include sensors to measure various pack level characteristics. The battery pack 124 may include one or more pack current measurement sensors 208, pack voltage measurement sensors 210, and pack temperature measurement sensors 212. The BECM 206 may include circuitry to interface with the pack current sensors 208, the pack voltage sensors 210 and the pack temperature sensors 212. The BECM 206 may have non-volatile memory such that data may be retained when the BECM 206 is in an off condition. Retained data may be available upon the next key cycle.

In addition to the pack level characteristics, there may be battery cell 202 level characteristics that are measured and monitored. For example, the terminal voltage, current, and temperature of each cell 202 may be measured. A system may use one or more sensor modules 204 to measure the battery cell 202 characteristics. Depending on the capabilities, the sensor modules 204 may measure the characteristics of one or multiple of the battery cells 202. The battery pack 124 may utilize up to $N_c$ sensor modules 204 to measure the characteristics of all the battery cells 202. Each of the sensor modules 204 may transfer the measurements to the BECM 206 for further processing and coordination. The sensor modules 204 may transfer signals in analog or digital form to the BECM 206. In some configurations, the functionality of the sensor modules 204 may be incorporated internally to the BECM 206. That is, the hardware of the sensor modules 204 may be integrated as part of the circuitry in the BECM 206 and the BECM 206 may handle the processing of raw signals. The BECM 206 may also include circuitry to interface with the one or more contactors 142 to open and close the contactors 142.

Figure 3A:
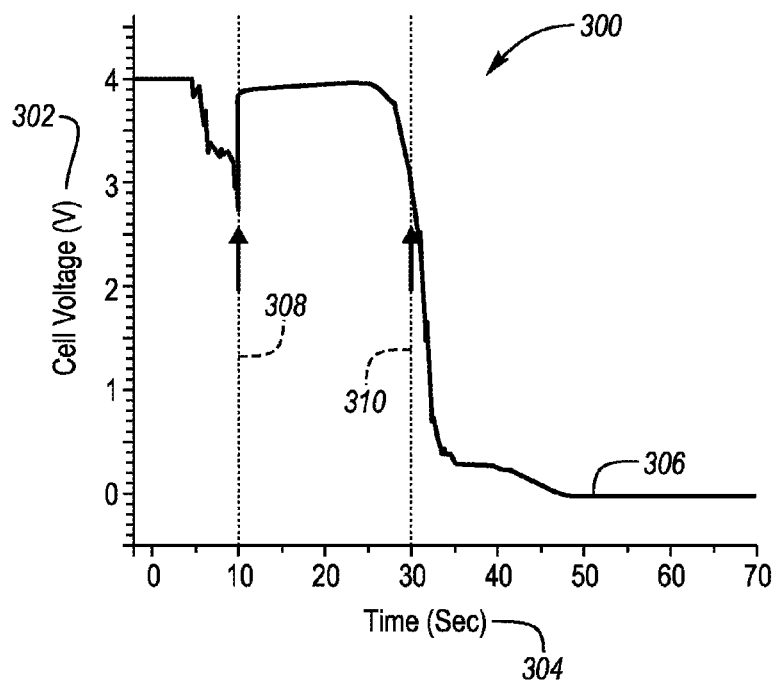
FIG. 3A is a graphical representation of a voltage of a battery cell with respect to time.

FIG. 3A is a graphical representation 300 of a profile 306 of a voltage 302 of a battery cell with respect to time 304. Here, the battery cell includes the battery cell 202 illustrated in FIG. 2. The term battery cell may be a single battery cell with a single anode and single cathode, or a battery cell with multiple anodes and multiple cathodes in which the multiple anodes and cathodes may be coupled in parallel, series, or a combination thereof. Here, the battery cell voltage profile 306 illustrates that an abrupt voltage change occurred at time 308. This voltage change might occur during charge, discharge or while the battery cell is at rest. An internal short is indicated if the magnitude of the voltage change exceeds a pre-determined threshold value. Depending upon the energy state of the battery cell and the nature of the internal short circuit, the flow of internal short circuit current may be interrupted, and the battery cell voltage may rebound. Again, depending upon the energy state of the battery cell and the amount of energy released during the internal short event, a thermal runaway event may occur within 10's of seconds of the initial internal short as indicated at time 310. Thus, momentary internal shorts may be precursors to thermal runaway events. The rate of change of voltage of the battery cell may be measured with respect to various conditions, including a change in time, a change in SOC, or a rate of change of current flow to the battery cell.

In another embodiment, the battery cell voltage profile 306 illustrates that during a discharge into a constant load, a voltage drop occurred at time 308. After the voltage drop at time 308, cell failure occurred at time 310 at which time the battery cell voltage rapidly dropped. Typically when a battery cell is being charged a battery cell current is not needed by any vehicle components or, a magnitude of current required from the battery cell is less than an available current from either a charge station or from an electric machine. To accurately detect a change in voltage of the battery, such as illustrated at time 308, the controller of the battery management system, such as a BECM 206, may opportunistically perform a partial discharge during a charge event. For example, while a HEV, such as a BEV or PHEV, is coupled with a charge station accepting a charge current, the controller may opportunistically charge or discharge the battery cell by selectively coupling a load having known characteristics. During the discharge to the load, a rate of change of voltage of the battery cell may be measured. The rate of change of voltage of the battery cell may be measured with respect to various conditions, including a change in time, a change in SOC, or a rate of change of current flow to the battery cell.

Figure 3B:
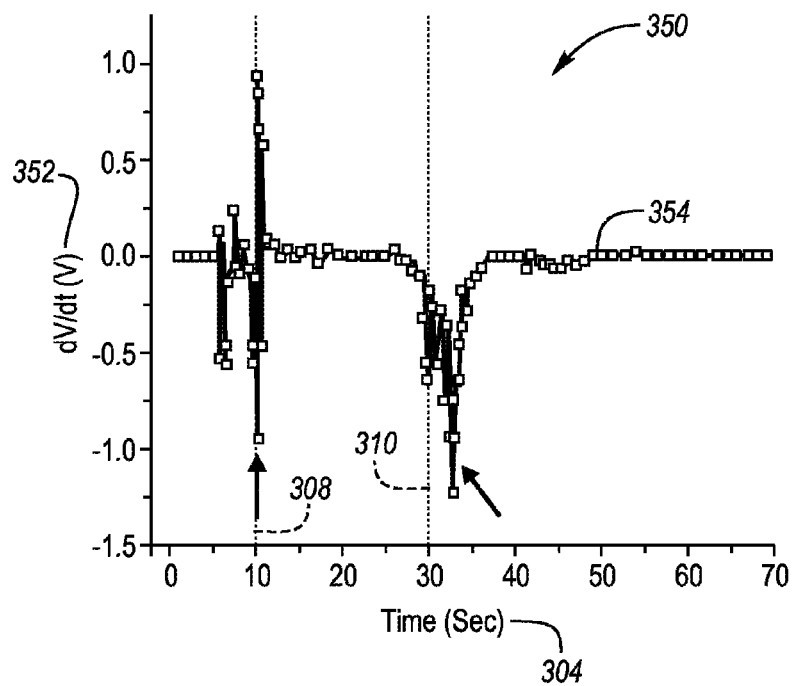
FIG. 3B is a graphical representation of a change in a voltage of a battery cell with respect to time (dV/dt).

FIG. 3B is a graphical representation 350 of a profile 354 of a change in a voltage of a battery cell with respect to a change in time (dV/dt) 352 is shown with respect to time 304. The rate of change of voltage of the battery cell with respect to time (dV/dt) is plotted to produce a profile 354. A controller may be used to monitor this profile. The controller may be configured to compare an upper threshold with the profile 354. The upper threshold may be derived from many battery characteristics including life of the battery, battery capacity, battery state of charge, battery current flow, battery chemistry, battery structure, and battery usage. For example, an upper threshold of 0.75 dV/dt set for FIG. 3B indicates that at point in time 308, the magnitude of the dV/dt exceeded the upper threshold and therefore is a signature or indication of a possible battery fault or error. A controller monitoring the dV/dt of the battery cell of FIG. 3 may, at point in time 308 output an error signal. The error signal may be used to notify the operator, along with notification, the controller may safely discharge the battery cell or bypass the battery cell.

Likewise, the controller may be configured to compare a count of a lower threshold with the profile 354. The lower threshold may be derived from many battery characteristics including life of the battery, battery capacity, battery state of charge, battery current flow, battery chemistry, battery structure, and battery usage. For example, a lower threshold of 0.25 dV/dt set for FIG. 3B indicates that prior to point in time 308, the magnitude of the dV/dt exceeded the lower threshold 5 times, and therefore is another signature or indication of a possible battery fault or error. A controller monitoring the dV/dt of the battery cell of FIG. 3 may, upon battery cell exceeding the lower threshold more than a predetermined number of times (e.g., a predetermined count of 5) such as at point in time 308 output an error signal. The error signal may be used to notify the operator, along with a notification, the controller may safely discharge the battery cell or bypass the battery cell. Along with monitoring and continuously accumulating the count the controller may be configured to monitor the dV/dt of the battery cell and upon the count exceeding the predetermined number of times (e.g., a predetermined count of 5) within a predetermined duration (e.g., a 10 second window) output an error signal, safely discharge the battery cell or bypass the battery cell.

Figure 4A:
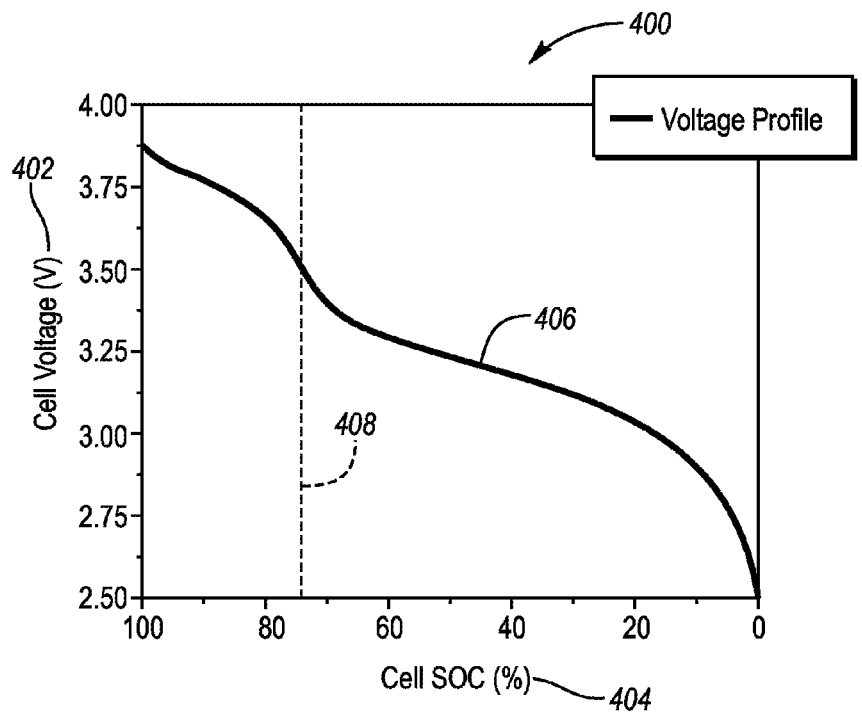
FIG. 4A is a graphical representation of a voltage of a battery cell with respect to a state of charge (SOC) of the battery cell.

FIG. 4A is a graphical representation 400 of a profile 406 of a voltage 402 of a battery cell with respect to a state of charge 404 of the battery cell. Here, a drop in cell voltage 402 occurs around 3.5 volts at point 408. The profile 406 is substantially smooth and as such may be difficult to use to interpret any signatures of potential faults.

Figure 4B:
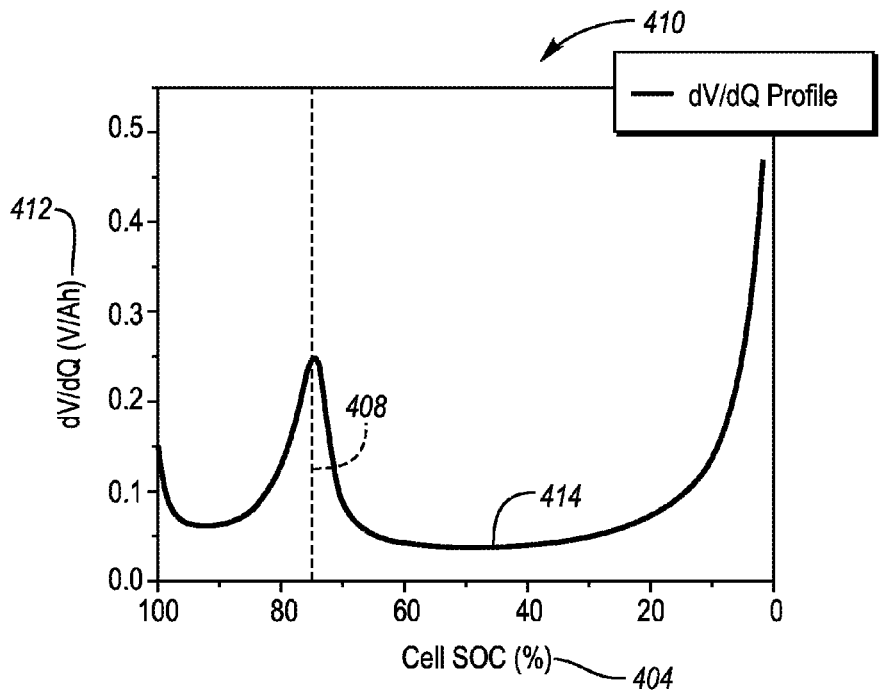
FIG. 4B is a graphical representation of a change in a voltage of a battery cell with respect to a change in charge of the battery (dV/dQ).

FIG. 4B is a graphical representation 410 of a profile 414 of a change in a voltage of a battery cell with respect to a change in charge of the battery (dV/dQ) or a state of charge of the battery (dV/dSOC) 412 shown with respect to the state of charge 404 of the battery cell. The rate of change of voltage of the battery cell with respect to charge dV/dQ is plotted to produce a profile 414. Also, the rate of change of voltage of the battery cell with respect to state of charge dV/dSOC is plotted to produce a profile 414. A controller may be used to monitor this profile 414. The controller may be configured to compare an upper threshold with the profile 414. The upper threshold may be derived from many battery characteristics including life of the battery, battery capacity, battery state of charge, battery current flow, battery chemistry, battery structure, and battery usage. For example, an upper threshold of 2.0 dV/dQ set for FIG. 4B indicates that at a battery cell state of charge of approximately 0.75, slightly after point 408, the magnitude of the dV/dQ (or dV/dSOC) exceeded the upper threshold and therefore is a signature or indication of a possible future battery fault or error. A controller monitoring the dV/dQ (or dV/dSOC) of the battery cell of FIG. 4B may, at point in time associated with the cell voltage of 3.4 volts output an error signal. The error signal may be used to notify the operator, along with a notification, the controller may safely discharge the battery cell or bypass the battery cell.

FIGS. 3A, 3B, 4A, and 4B illustrate abnormal profiles or signatures of a voltage differential, dV/dt, dV/dQ or dV/dSOC during initial stages of an internal short or Li plating events respectively. Further, during excess capacity loss, cell capacity could drop below the mark of approximately 70% of a cell capacity at a battery cell beginning of life (BOL). Thus, we show that a controller may conduct a charge or a discharge test on battery cells and look for signatures for dV/dt, dV/dQ, dV/dSOC or low capacity for cells and issue alerts indicating potential cell faults. Similar to a discharge test, a charging test may be performed in which a controller monitors a rate of change of voltage of a battery cell during battery charging with respect to a change in time, a change in SOC, or a change in battery cell current.

A controller may be used to detect an internal short of a battery cell by monitoring a rate of change of voltage of a battery cell. The controller may monitor the rate of change of voltage while no charge/discharge current is flowing, or while a constant, non-changing current flows. However, similar dV/dt, dV/dQ or dV/dSOC threshold measurement techniques can be applied during periods of dynamic current flow if simultaneous dI/dt measurements are made.

The difference between micro shorts (e.g., temporary short) and a hard short (e.g., permanent short) is that a micro short typically only lasts approximately a few milliseconds or a few seconds after which the cell voltage returns to the level seen before the onset of a micro short event. However, the cell voltage does not recover with a hard short or a soft short. Here, a method for detecting hard shorts or soft shorts via the measurement of dV are shown. The methods include determination and detection of a rate of change of voltage of a battery cell also referred to as voltage signatures.

A voltage signature may include a measured rate of change of voltage with respect to time (dV/dt), which exceeds certain threshold value typically expressed in volts per second (e.g., 0.5 V/s). Once a voltage signature has been detected, the controller may be further configured to measure and record statistics related to the voltage signature. For example, a total number of voltage signatures for a given cell may be recorded in memory of the battery monitoring system. Further, the magnitude of the voltage signature may be characterized by recording a peak dV (also described as the magnitude of the event). If the event count is too high or the peak magnitude is significant, then the controller may output a fault signal indicative of a potential imminent hard or soft short.

Figure 5:
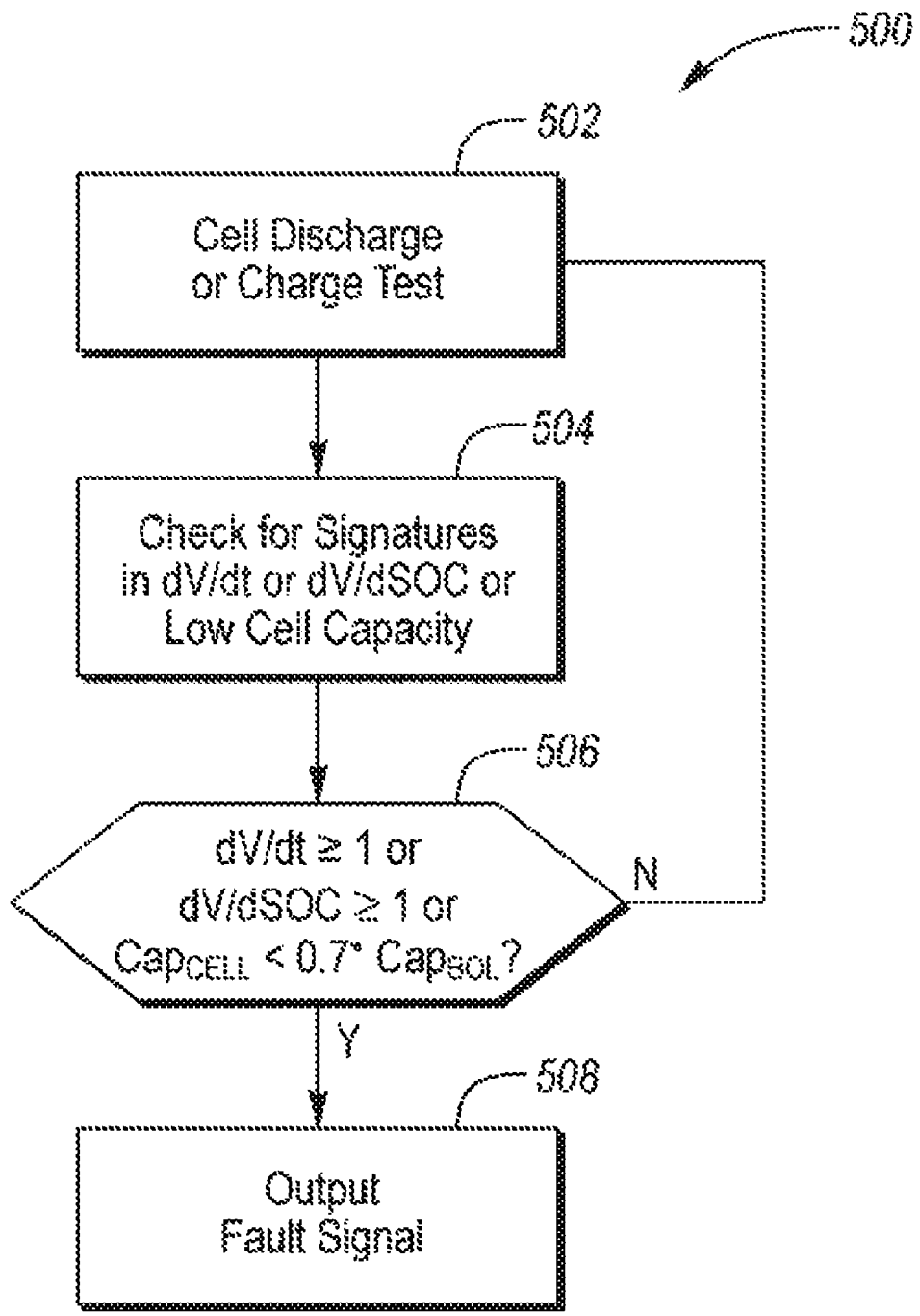
FIG. 5 is a flow diagram of battery cell fault detection based on a change in a battery cell voltage with respect to a change in time or charge, or SOC exceeding a threshold.

FIG. 5 is a flow diagram 500 of battery cell fault detection based on a change in a battery cell voltage exceeding a threshold. In operation 502, a controller performs a battery cell discharge test or a battery cell charge test. The discharge test may include coupling a load to a battery cell such that a current flows into the load. Ideally the load has known characteristics and therefore the electrical response of the battery should be easily predicted. Alternatively, the controller may perform a charge test in which a known and regulated power supply is provided to the battery cell.

In operation 504, the controller monitors a rate of change of voltage (dV) across the battery cell in response to the battery cell operation test 502. The controller monitors, measures, and records the rate of change of voltage (dV) across the battery cell. The rate of change of voltage (dV) across the battery cell may be measured with respect to an associated change in time or an associated change in charge (or SOC) of the battery cell. Further, a signature of a low capacity of the battery cell may be monitored, measured and recorded.

In operation 506, the controller compares the rate of change of voltage across the battery cell with respect to an associated time (dV/dt) with a predetermined dV/dt threshold (e.g., 1V/s). The controller then compares the rate of change of voltage across the battery cell with respect to an associated charge or SOC of the battery cell (dV/dQ or dV/dSOC) with a predetermined dV/dQ or dV/dSOC threshold. And the controller then compares the battery cell capacity ($Cap_{CELL}$) with a predetermined percentage of the battery cell capacity at the beginning of life of the battery cell ($Cap_{BOL}$). If either, (dV/dt) exceeds the predetermined dV/dt threshold, dV/dQ (or dV/dSOC) exceeds the predetermined dV/dQ (or dV/dSOC) threshold, or ($Cap_{CELL}$) is less than the predetermined percentage of ($Cap_{BOL}$), the controller will proceed to operation 508.

In operation 508, the controller outputs the fault signal. The fault signal may be output to a visual display in view of an operator of the vehicle, output to an audio system to provide an audible alert to the operator of the vehicle, or transmitted to a system remote from the vehicle for further diagnostics. Along with outputting the fault signal, the controller may discharge the battery cell, or may bypass the battery cell.

For example, if a battery cell fault is determined to pose an unacceptable risk to safe operation of the battery pack, the energy state of a single cell or of the entire pack can be reduced by discharging through the same bleed resistor (or resistors) used for balancing the SOC of cells within the battery pack using already present circuitry, thus mitigating risk of a thermal event.

Likewise, if the functionality of a single cell is limiting the functionality of the entire battery pack consisting of many otherwise acceptably performing cells, the single faulty cell may be electrically disconnected from its nearest neighbors and an electrical conducting bridge could be inserted in place of the cell. This would require the presence of electronic or mechanical switches capable of handling the associated current.

In an alternative embodiment, the fault signal may be sent to a battery diagnostics module (BDM). The BDM is a control unit that diagnoses battery short term and long term health conditions, including the health of battery hardware components such as current sensors, voltage sensors, temperature sensors, contactors, as well as the health of battery cells, including cell capacity. The battery diagnostic module may be electrically within a BECM, or it may be a separate ECU connected with the BECM through communication means such as LIN, CAN network, RS232 serial communication, or through wireless communication. The BDM may record conditions of the battery Once a voltage signature is identified, the controller may wait, via a delay, for a predetermined time, for example for 2 seconds, before recording any additional voltage signatures. The delay is due to a condition in which a single event creates a number of dV spikes of which only the first one is relevant for indicating the existence of an event or battery cell fault.

Figure 6:
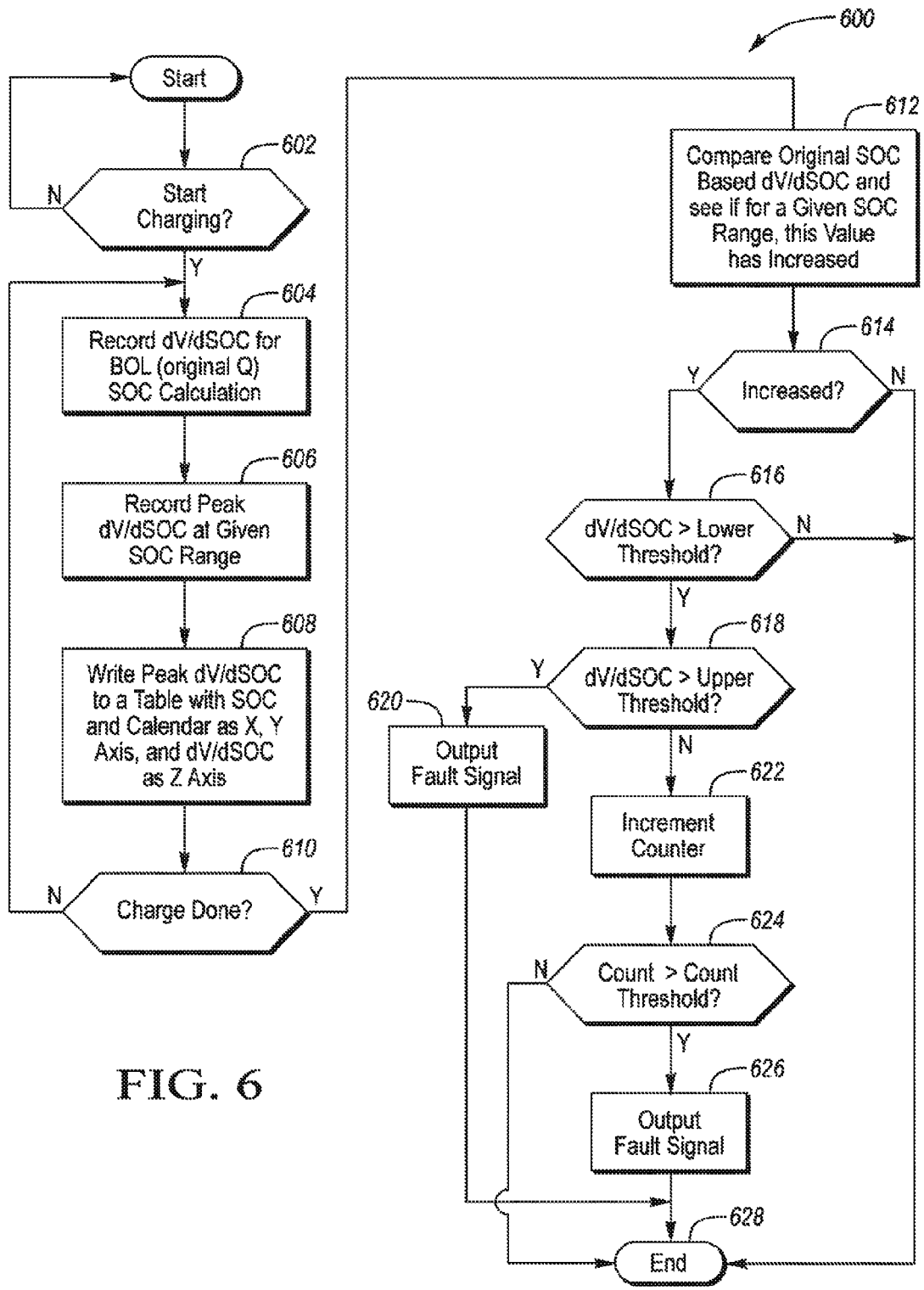
FIG. 6 is a flow diagram of battery cell fault detection based on a change in a battery cell voltage exceeding an upper threshold or exceeding a lower threshold a number of times.

FIG. 6 is a flow diagram 600 of battery cell fault detection based on a rate of change of a battery cell voltage exceeding an upper threshold or exceeding a lower threshold a number of times.

In operation 602, a controller performs a battery cell charge test or a battery cell discharge test. The charge test may include coupling a known and regulated power supply with the battery cell such that a current flows into the battery cell. Alternatively, the discharge test may include coupling a load to a battery cell such that a current flows into the load. Ideally the load has known characteristics and therefore the electrical response of the battery should be easily predicted.

In operation 604, the controller monitors a rate of change of voltage (dV) across the battery cell in response to the battery cell test of operation 602. The controller monitors, measures, and records the rate of change of voltage (dV) across the battery cell. The rate of change of voltage (dV) across the battery cell may be measured with respect to an associated change in time, change in charge or an associated change in SOC of the battery cell. Further, a signature of a low capacity of the battery cell may be monitored, measured and recorded.

In operation 606, a peak rate of change of voltage across the battery cell with respect to an associated charge (or SOC) of the battery cell dV/dQ (or dV/dSOC) within a given SOC range is recorded. In operation 608, the controller records the dV/dQ (or dV/dSOC) in memory. The data is shown recorded as a table; however the recording may use other data structure forms.

In operation 610, the controller determines if the charge test or the discharge test is complete, if the test is not complete, the controller repeats operations 604, 606, 608, and 610. If the test is complete, the controller proceeds to operation 612.

In operation 612, the controller compares an original SOC based dV/dQ (or dV/dSOC), associated with a SOC level similar with the current SOC, with a current dV/dQ (or dV/dSOC) at the current SOC. In operation 614, the controller checks the comparison of operation 612, if there is a difference less than a predetermined amount, the controller exits at operation 628. If there is a difference greater than a predetermined amount, the controller proceeds to operation 616.

In operation 616, the controller compares the rate of change of voltage across the battery cell with respect to an associated charge (or SOC) of the battery cell dV/dQ (or dV/dSOC) with a predetermined lower dV/dQ (or dV/dSOC) threshold. Alternatively, the controller may compare the rate of change of voltage across the battery cell with respect to an associated time (dV/dt) with a predetermined lower dV/dt threshold. If dV/dQ (or dV/dSOC) does not exceed the predetermined lower dV/dQ (or dV/dSOC) threshold, or alternatively dV/dt does not exceed the predetermined lower dV/dt threshold, the controller will proceed to exit at operation 628. If dV/dQ (or dV/dSOC) exceeds the predetermined lower dV/dQ (or dV/dSOC) threshold, or alternatively dV/dt exceeds the predetermined lower dV/dt threshold, the controller will proceed to operation 618.

In operation 618, the controller compares the rate of change of voltage across the battery cell with respect to an associated charge (or SOC) of the battery cell dV/dQ (or dV/dSOC) with a predetermined upper dV/dQ (or dV/dSOC) threshold. Alternatively, the controller may compare the rate of change of voltage across the battery cell with respect to an associated time (dV/dt) with a predetermined upper dV/dt threshold. If dV/dQ (or dV/dSOC) exceeds the predetermined upper dV/dQ (or dV/dSOC) threshold, or alternatively dV/dt exceeds the predetermined upper dV/dt threshold, the controller will proceed to operation 620. If dV/dQ (or dV/dSOC) does not exceed the predetermined lower dV/dQ (or dV/dSOC) threshold, or alternatively dV/dt does not exceed the predetermined lower dV/dt threshold, the controller will proceed to operation 622

In operation 622, the controller increments a counter and proceeds to operation 624. In operation 624, the controller compares the counter with a count threshold (e.g., 5 instances of dV/dQ (or dV/dSOC) exceeding the predetermined lower dV/dQ (or dV/dSOC) threshold). If the count is less than or equal to the count threshold, the controller will proceed to exit at operation 628. If the count is greater than the count threshold, the controller will proceed to operation 626. The count threshold is important because if there are more frequent voltage signature events in a particular cell, that particular cell may eventually manifest a hard or soft short, leading to the cell fault.

In operation 620 and also in operation 626, the controller outputs the fault signal. The fault signal may be output to a visual display in view of an operator of the vehicle, output to an audio system to provide an audible alert to the operator of the vehicle, or transmitted to a system remote from the vehicle. Along with outputting the fault signal, the controller may discharge the battery cell, or may bypass the battery cell.

Further enhancements of excess cell capacity loss detection and prediction can be made through collection of series of measurements as outlined in FIG. 6, where a trend can be determined on whether excess capacity loss is increasing. For example, it is possible to use numerous data set (collected at different dates) using the criteria shown in FIG. 6 and for the same cell voltage or SOC, we compare dV/dt and/or dV/dQ (or dV/dSOC) and see if the signature is increasingly significant as compared with earlier data. Predictions may be made based on such observation.

An example of opportunistic testing using a partial discharge during charge event (via a power grid or during vehicle operation) includes when the battery cell SOC is greater than 50% such as a vehicle at 90% SOC. Vehicle operation includes a time when the vehicle is traveling on a roadway propelled by either an internal combustion engine, an electric machine, or a combination thereof, or a time when a vehicle is in a key-on condition. Generally with a Li-ion battery cell with a 3.7V nominal voltage, a rate of change of voltage of the battery cell of greater than 3V (e.g., 80% of nominal cell voltage) is indicative of a fault, therefore an upper threshold may be set to 3V. A rate of change of voltage of the battery cell of between 1-2V (25% to 50% of nominal cell voltage) is indicative of a warning condition or a lower threshold. If the battery cell exceeds the lower threshold more than a predetermined number of times (e.g., 10 times) that may be an indication of a fault.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A battery management system for a vehicle comprising:
a controller configured to, in response to a rate of change of voltage during discharge of a battery cell exceeding a first threshold more than a predetermined number of times over a predefined duration, output an error signal, and in response to the rate of change exceeding a second threshold greater than the first, output the error signal.

2. The battery management system of claim 1, wherein the controller is further configured to, in response to a capacity of the battery cell transitioning to a value that is less than a predetermined percentage of a beginning of life capacity of the battery cell, output the error signal.

3. The battery management system of claim 2, wherein the controller is further configured to, in response to outputting the error signal, display an alert to a vehicle operator.

4. The battery management system of claim 2, wherein the controller is further configured to, in response to outputting the error signal, transmit the signal to a diagnostic module.

5. The battery management system of claim 2, wherein the controller is further configured to, in response to outputting the error signal, bypass a battery cell.

6. The battery management system of claim 2, wherein the controller is further configured to, in response to outputting the error signal, discharge a battery cell associated with the rate of change of voltage.

7. The battery management system of claim 1, wherein the rate of change of voltage is associated with a rate of change of current flow to the battery cell.

8. The battery management system of claim 1, wherein the rate of change of voltage is associated with a rate of change of charge of the battery cell or a rate of change in state of charge of the battery cell.

9. A vehicle battery management system comprising:
a controller configured to, in response to a rate of change of voltage of a battery cell exceeding a first threshold while partially discharging the battery cell during a recharge event, or in response to a number of instances in which the rate of change exceeds a second threshold that is less than the first threshold exceeding a count threshold, output an error signal.

10. The vehicle battery management system of claim 9, wherein the controller is further configured to, in response to outputting the error signal, bypass the battery cell.

11. The vehicle battery management system of claim 9, wherein the controller is further configured to, in response to outputting the error signal, discharge the battery cell associated with the rate of change of voltage.

12. The vehicle battery management system of claim 9, wherein the rate of change of voltage is associated with a rate of change of current flowing from the battery cell.

13. The vehicle battery management system of claim 9, wherein the rate of change of voltage is associated with a rate of change of state of charge of the battery cell.

14. The vehicle battery management system of claim 9, wherein the rate of change of voltage is associated with a rate of change of time.

15. The vehicle battery management system of claim 9, wherein the controller is further configured to, in response to a capacity of the battery cell dropping below a predetermined percentage of a beginning of life capacity of the battery cell, output the error signal.

16. A method of operating a battery pack for a vehicle comprising:
discharging a battery cell when the battery cell exceeds a state of charge threshold; and
in response to a rate of change of voltage of the battery cell exceeding a first threshold more than a predetermined number of times during a predefined discharge duration, or the rate of change exceeding a second threshold greater than the first threshold, outputting a fault signal.

17. The method of claim 16, wherein discharging the battery cell is flowing an electric charge from the battery cell to a test load, wherein the electric charge is less than 1% of a maximum state of charge capacity of the battery cell.

18. The method of claim 17 further comprising draining charge from the battery cell to less than 10% of a maximum state of charge capacity of the battery cell in response to outputting the fault signal.

19. The method of claim 17 further comprising bypassing the battery cell in response to outputting the fault signal.

* * * * *